United States Patent [19]

Hill

[11] Patent Number: 5,692,918
[45] Date of Patent: Dec. 2, 1997

[54] TWO-PIECE UNIVERSAL CABLE-CONNECTOR ADAPTER

[75] Inventor: A C Hill, Navasota, Tex.

[73] Assignee: Teledyne Brown Engineering, Division of Teledyne, Houston, Tex.

[21] Appl. No.: 654,234

[22] Filed: May 28, 1996

Related U.S. Application Data

[60] Provisional application No. 60/006,371 Nov. 8, 1995.

[51] Int. Cl.$^6$ .................................................. H01R 4/38
[52] U.S. Cl. ............................ 439/323; 439/347; 439/923; 174/101.5; 367/191
[58] Field of Search ............................ 439/312, 320, 439/321, 323, 347, 923, 191, 201, 204; 367/15–24, 191; 24/22 R, 23 R, 24, 101.5

[56] References Cited

U.S. PATENT DOCUMENTS

| | | | |
|---|---|---|---|
| 3,786,410 | 1/1974 | Hazelhurst | 340/17 |
| 3,987,537 | 10/1976 | Warren | 29/592 |
| 4,759,001 | 7/1988 | Keckler et al. | 367/191 |
| 4,967,400 | 10/1990 | Woods | 367/21 |
| 5,297,974 | 3/1994 | Fussell | 439/320 |

*Primary Examiner*—Khiem Nguyen
*Attorney, Agent, or Firm*—William A. Knox

[57] ABSTRACT

A seismic cable connector adapter assembly for coupling sub-diameter seismic streamer-cables to standard-sized instrumented cable connector modules.

3 Claims, 2 Drawing Sheets

TWO-PIECE UNIVERSAL CABLE-CONNECTOR ADAPTER

BACKGROUND OF THE INVENTION

1. Relation to Other Applications

This application is a regularly filed patent application having priority from the filing data of Provisional patent application Ser. No. 06/006,371, filed Nov. 8, 1995 in the name of A C Hill, entitled TWO-PIECE UNIVERSAL CABLE-CONNECTOR ADAPTER.

2. Discussion of Related Art

Marine seismic streamer cables consist of 25–50 separate sections, each about 50 to 100 meters long. A cable section consists of an outer plastic hose-like jacket often about three inches in diameter but sometimes smaller in order to reduce overall weight and to reduce towing forces. The jacket contains a plurality of seismic sensors, signal transmission lines, power lines, stress members, and a filling of a light-weight fluid to provide neutral buoyancy. The respective cable sections are interconnected by means of connector modules that contain electronics for partially processing the signals from the seismic sensors and for transmitting the partially processed signals to the towing ship for additional processing and archival storage.

There are a plethora of patents describing various aspects of seismic streamer cable design. U.S. Pat. No. 4,967,400 presents an overview of available literature on streamer cables which patent is incorporated herein by reference and to which the student of streamer-cable design is referred. In particular, FIG. 19 of the patent illustrates a typical cable connector module 26.

Seismic streamer cable sections are interconnected with the cable connector modules by means of a cable termination fitting at each end of a cable section. The leading end of the section usually has a threaded female member that mates with a threaded male member at the trailing end of an adjacent connector module or section. For good and sufficient reasons, regardless of the diameter of the jacket of a streamer cable section, the cable connector modules are furnished to the Industry in a single standard size that happens to require use of cable termination fittings sized for a three-inch jacket.

A cable harness includes the equipment that must be stuffed inside the cable jacket including: Seismic sensors, stress member, supporting bulkheads, electrical and/or optical signal transmission lines, as well as the cable end terminations. Customarily the harness is pushed through the jacket by creating an hydraulic or pneumatic pressure differential across the opposite ends of the plastic jacket. The process is described, for example, in U.S. Pat. No. 3,987,537, issued Oct. 26, 1976 to N. M. Warren and assigned to a predecessor firm of the assignee of this invention and which is incorporated herein by reference.

The cable-stuffer of the '537 patent assumes that the outside diameter of the cable end terminations are small enough to pass through the jacket. But that is not possible if a sub-diameter cable jacket is to be used with a standard-diameter connector module because the end termination fitting is too bit to fit through the smaller jacket. An adapter assembly is required.

As earlier explained, the streamer cable, which may be two or three miles long, being towed in that water, may encounter underwater obstructions. It may be snagged by shrimp-fishers' nets, rival exploration ships, offshore oil rigs or the like. Streamer cables typically cost on the order of mega-dollars. If the streamer cable is snagged, the ship cannot immediately stop so that the streamer cable is likely to be rent asunder. Such an accident results in nearly complete loss of the structural integrity of one or more sections. To avoid such catastrophic losses, it is desirable to provide a weak link arrangement such that the weak link will give way but leave the affected cable section structurally intact for later recovery. One such weak link for use with a towed seismic cable is taught in U.S. Pat. No. 3,786,410, issued Jan. 15, 1974 to G. D. Hazelhurst. However, that device is designed for use with land cables and is not suitable for use in a marine environment.

Among other desiderata, there is a need for a streamer-cable adapter assembly for mating a sub-diameter cable section to a standard-sized connector module.

SUMMARY OF THE INVENTION

The cable connector adapter assembly comprises two members: (a) The first member is a cylindrical cable-section end termination having an outer diameter commensurate with the inner diameter of a preferred cable jacket. A first portion of the outer surface of the end termination is serrated for tightly gripping the end of the jacket while a second portion of the outer surface comprises a smooth shank. The cable-section end termination further includes a bore for receiving therethrough selected portions of a harness member. (b) The second member is a cylindrical threaded connector housing of a preselected gender. The second member includes a bore for snugly receiving the smooth shank portion of the cable-section end termination; (c) The adapter assembly further includes an anchor pin for releasably locking the shank portion of the cable-section end termination in the bore of the termination housing.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
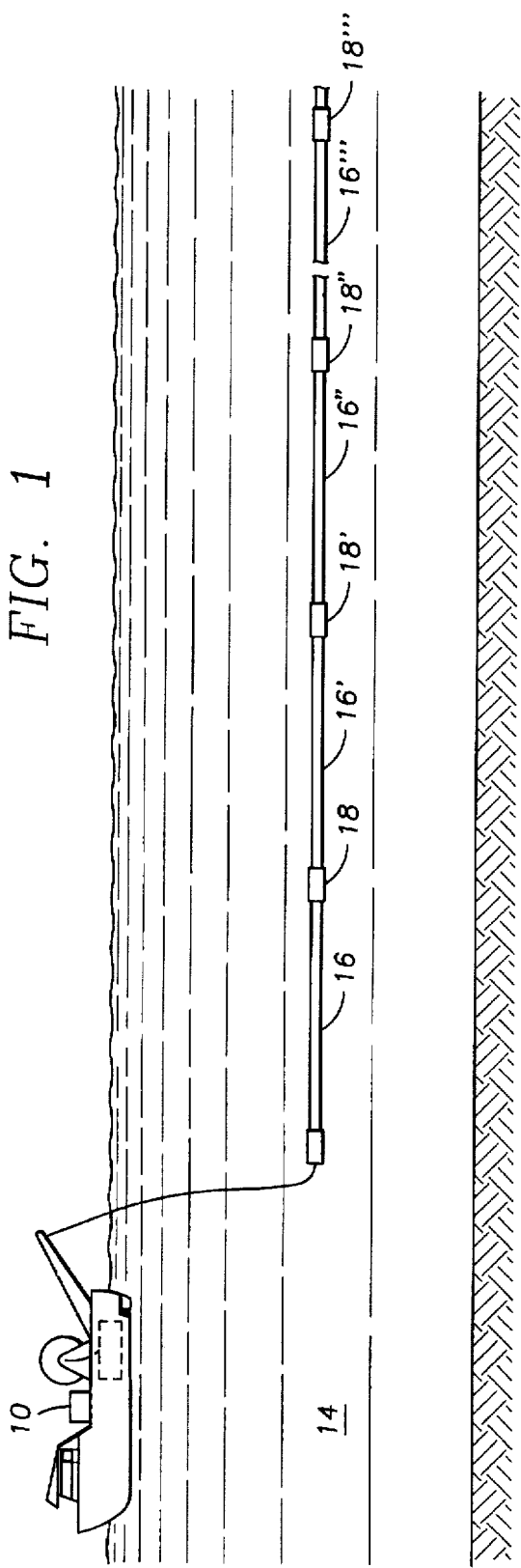
FIG. 1 shows a ship towing a seismic streamer cable through a body of water.

FIG. 1 shows a ship 10 towing a seismic streamer cable 12 through a body of water 14. Streamer cable 12 consists of a plurality of sections 16, 16', 16", 16'" that are coupled together by cable connector modules 18, 18', 18", 18'". Four such cable sections and four connector modules are shown but many more may be used in practice. For purposes of this disclosure, the respective cable sections are symbolically shown to be sub-diameter relative to standard-sized connector modules.

Figure 2:
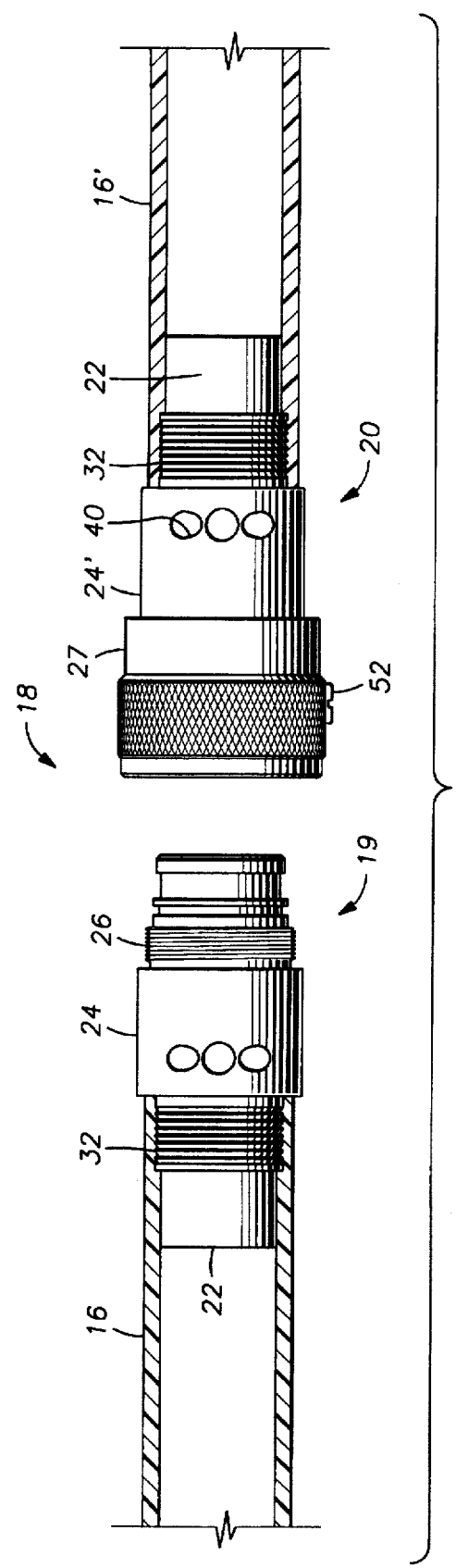
FIG. 2 is a side view of the cable connector adapter as fitted to male and female connector housings of a cable end termination fitting.
Figure 3:
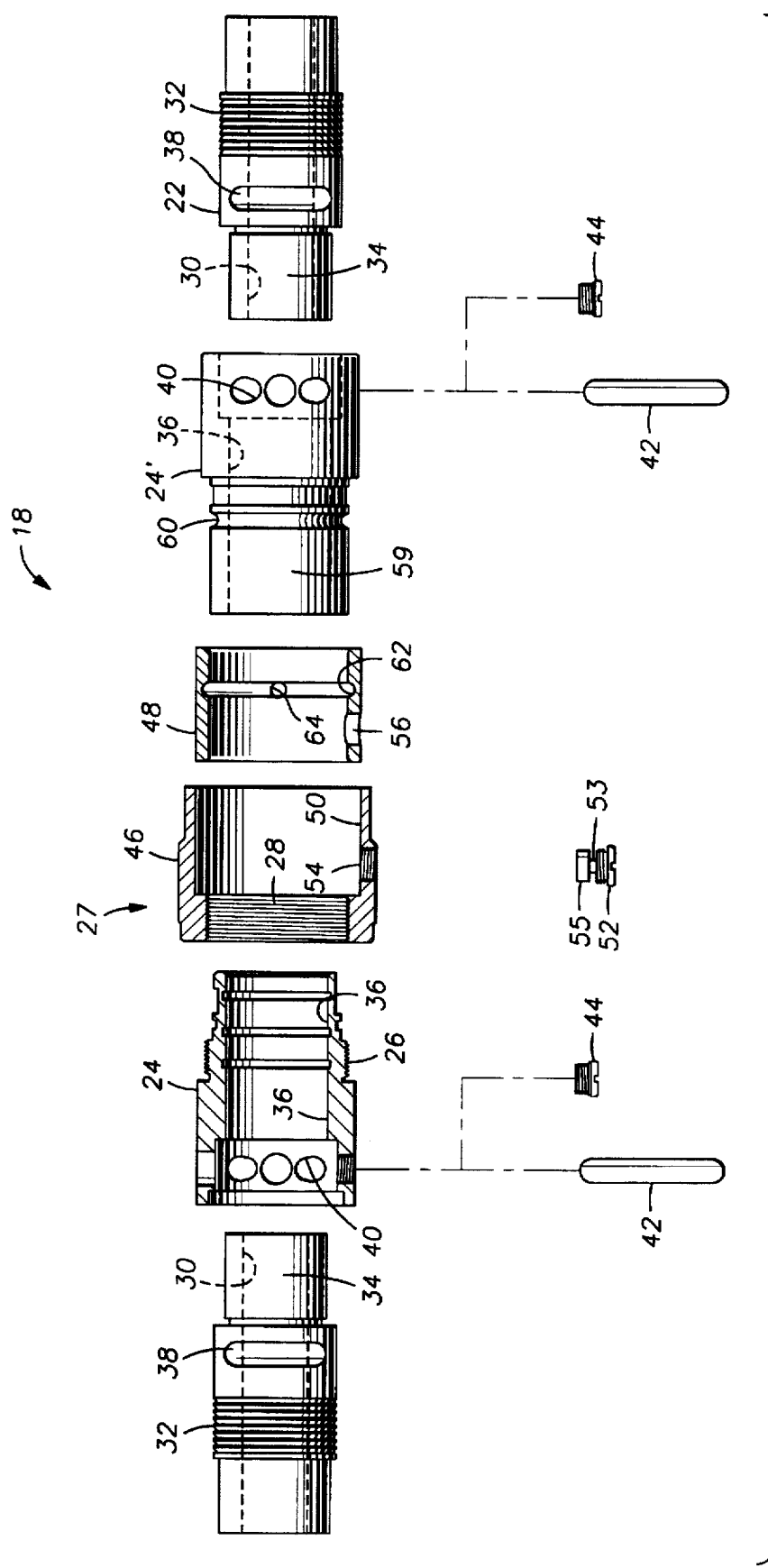
FIG. 3 is an exploded cross-sectional view of the cable connector adapter.

Refer now to FIGS. 2 and 3. FIG. 2 is an overall side view of a typical male and female cable connector adapter assemblies 19 and 20 respectively, as fitted into the trailing end of section 16 and into the leading end of cable section 16'. The arrangement could be reversed, of course. Regardless of gender, the cable connector adapter assembly is comprised essentially of two members: a cylindrical cable-section end termination 22 and a threaded cylindrical connector housing 24. The male connector housing includes an externally threaded portion 26. The female connector housing 24' includes a cylindrical, rotatable member 27 that has an internally threaded portion 28 (FIG. 3) to engage the threads 26 of the male connector housing of an adjacent cable section such as 16 or a standard connector module.

With reference to FIGS. 2 and 3, a cable-section end termination such as 22 is characterized by an outer diameter that is commensurate with the inner diameter of the of the desired-sized jacket 17 of a cable section such as 16. A first portion of the outer surface of the end termination is serrated as at 32 for firmly gripping the cable section jacket 17. An external band (not shown) may be wrapped around the outside of the jacket 17 for additional security. A second portion of the outer surface of the cable-section end termination 22 comprises a smooth shank 34. End termination 22 also defines a bore 30, through which selected portions of a harness may be passed in accordance with well-known manufacturing methods but which harness is not shown to avoid complicating the drawings because it is not germane to this invention.

The second member of the cable connector adapter assembly is a cylindrical threaded connector housing of appropriate gender. The second member includes a bore, 36, therethrough for snugly receiving the smooth shank portion of end termination 22. The term snugly is here used in the ordinary dictionary meaning of the word.

An end termination such as 22 is provided with a semi-cylindrical slot 38 aligned orthogonally to the longitudinal axis of the fitting 22. A bore, 40, is drilled across a chord of the wall of the connector housing 24' orthogonally to the longitudinal axis thereof. When slot 38 in end termination 22 is aligned with bore 40 in connector housing 24', an anchor pin 42 is inserted through bore 40 and releasably locked in place by a set screw 44. Preferably two such anchor pins are used, one on each side of the connector housing, the second pin being hidden from view.

A weak link assembly may be constructed in the rotatable portion 27 of a female connector housing and is designed as follows. The female connector housing consists of an outer housing 46 and an inner housing 48 which telescopes into a bore 50 in outer housing 46. The two housings are constrained to rotate together, indexed by weak-link pin 52 which has a reduced-diameter portion 53 and a base portion 55. In use, inner housing 48 is fitted into outer housing 46 with threaded orifice 54 aligned with a detent 56. When screwed in place, base 55 of weak link 52 engages detent 56 to lock the two members in place. Weak link 52 is calibrated to withstand a preselected tension such as 4000 pounds before failure. Weak link 52 is designed such that the reduced-diameter portion 53 coincides with the interface between inner and outer connector housings 46 and 48.

Female connector housing 24' includes a ball race 60 around its circumference. Rotatable portion 27 includes a corresponding internal ball race 62. During assembly, ball race 62 in rotatable portion 27 is aligned with ball race 60 in the fixed portion. A plurality of ball bearings (not shown) are poured into the aligned races through as ball entry port 64. When the race is full outer sleeve 46 is slipped over inner sleeve 48, sealing closed ball insertion port 64.

This invention has been described with a certain degree of specificity by way of example but not by way of limitation. Those skilled in the art will devise obvious variations to the examples given herein but which will fall within the scope and spirit of this invention which is limited only by the appended claims.

What is claimed is:

1. A seismic cable-section connector adapter assembly, comprising:

a cylindrical cable-section end termination having an outer diameter commensurate with the inner diameter of a preferred cable jacket;

said end termination having an outer surface, a first portion of which is serrated for tightly gripping an end of the jacket, a second portion of the outer surface comprising a smooth shank;

a bore through said end termination;

a cylindrical threaded connector housing of a preselected gender, the connector housing including a bore for snugly receiving the smooth shank of the end termination; and at least one anchor pin means for releasably locking the shank portion of the end termination in the bore of the connector housing.

2. The cable-section connector adapter assembly as defined by claim 1, wherein:

the cylindrical threaded connector housing includes an internally-threaded rotatable female member.

3. The cable-section connector adapter assembly as defined by claim 1, wherein:

the cylindrical threaded connector housing includes an externally threaded male member.

* * * * *